US012062052B2

(12) United States Patent
Bhusri et al.

(10) Patent No.: US 12,062,052 B2
(45) Date of Patent: *Aug. 13, 2024

(54) SYSTEMS FOR SECURING TRANSACTIONS BASED ON MERCHANT TRUST SCORE

(71) Applicant: Capital One Services, LLC, McLean, VA (US)

(72) Inventors: Nimma Bhusri, New York, NY (US); Xiaoguang Zhu, New York, NY (US); Ljubica Chatman, New York, NY (US); Lukiih Cuan, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,021

(22) Filed: Feb. 17, 2023

(65) Prior Publication Data
US 2023/0206246 A1    Jun. 29, 2023

Related U.S. Application Data

(63) Continuation of application No. 16/883,108, filed on May 26, 2020, now Pat. No. 11,605,090.

(51) Int. Cl.
*G06Q 20/40* (2012.01)
*G06F 16/951* (2019.01)
(Continued)

(52) U.S. Cl.
CPC ....... *G06Q 20/4097* (2013.01); *G06F 16/951* (2019.01); *G06F 21/313* (2013.01); *G06N 20/00* (2019.01)

(58) Field of Classification Search
CPC ............. G06Q 20/4097; G06Q 20/351; G06Q 20/4016; G06Q 30/0185; G06Q 30/0282;
(Continued)

(56) References Cited

U.S. PATENT DOCUMENTS 7,822,631 B1  10/2010  Vander et al.
7,860,755 B2  12/2010  Warner
(Continued)

FOREIGN PATENT DOCUMENTS

WO    WO-2011112418 A2 *  2/2011  ............. G06Q 20/12
WO       2011112418 A2     9/2011
(Continued)

OTHER PUBLICATIONS

Quick Reference Booklet—Merchant Edition, Nov. 15, 2018, 352 pages, MasterCard (Year: 2018).*

(Continued)

*Primary Examiner* — James D Nigh (74) *Attorney, Agent, or Firm* — TROUTMAN PEPPER HAMILTON SANDERS LLP; Christopher J. Forstner; John A. Morrissett (57) ABSTRACT

Systems for securing transactions based on merchant trust score are disclosed. The system may receive information identifying a merchant from a user device and, in response, retrieve transaction data associated with the merchant and receive website data in response to receiving information identifying the merchant. The system may use a machine learning model to generate a merchant trust score for the merchant, and determine whether the merchant trust score is less than a predetermined threshold. The system may also generate or retrieve an alternative payment method and provide related information or a recommendation to the user device.

20 Claims, 5 Drawing Sheets

(51) Int. Cl.
*G06F 21/31* (2013.01)
*G06N 20/00* (2019.01)
*G06Q 20/34* (2012.01)
*G06Q 30/018* (2023.01)
*G06Q 30/0282* (2023.01)
*G06Q 30/0601* (2023.01)

(58) Field of Classification Search
CPC .. G06Q 30/0609; G06F 16/951; G06F 21/313
USPC .......................................................... 705/75
See application file for complete search history.

(56) References Cited

U.S. PATENT DOCUMENTS

| | | | |
|---|---|---|---|
| 8,327,131 | B1 | 12/2012 | Hardjono |
| 9,600,819 | B2 | 3/2017 | Wiesman |
| 9,990,631 | B2 | 6/2018 | Eisen |
| 10,037,533 | B2 | 7/2018 | Caldera |
| 2003/0163413 | A1* | 8/2003 | Wiczkowski .......... G06Q 40/03 705/38 |
| 2014/0040147 | A1* | 2/2014 | Varadarajan ....... G06Q 20/4016 713/168 |
| 2015/0142595 | A1 | 5/2015 | Acuña-rohter |
| 2015/0294339 | A1* | 10/2015 | Vargas ................. G06Q 20/405 705/14.17 |
| 2016/0267406 | A1* | 9/2016 | Bodo ................. G06Q 10/0635 |
| 2017/0011395 | A1 | 1/2017 | Pillai et al. |
| 2017/0103388 | A1 | 4/2017 | Pillai et al. |
| 2020/0234268 | A1* | 7/2020 | Kohli ................... G06Q 20/405 |
| 2020/0327548 | A1* | 10/2020 | Hartard ................. G06Q 20/12 |

FOREIGN PATENT DOCUMENTS

| | | | | |
|---|---|---|---|---|
| WO | | 2015011655 A1 | 1/2015 | |
| WO | WO-2015011655 A1 | * | 1/2015 | ........... G06Q 20/085 |

OTHER PUBLICATIONS

"Quick Reference Booklet—MCC codes" downloaded from https://www.mastercard.us/content/dam/mccom/en-us/documents/rules/quick-reference-booklet-merchant-edition.pdf (Year: 2018).

* cited by examiner

SYSTEMS FOR SECURING TRANSACTIONS BASED ON MERCHANT TRUST SCORE

CROSS-REFERENCE TO RELATED APPLICATIONS

This application is a continuation of, and claims priority under 35 U.S.C. § 120 to, U.S. patent application Ser. No. 16/883,108, filed May 26, 2020, the entire contents of which are fully incorporated herein by reference.

FIELD OF INVENTION

The present disclosure relates to systems that recommend and/or selectively enable or disable certain payment methods for a particular merchant that a customer may be unfamiliar with and, more particularly, to systems that generate a merchant trust score for the particular merchant, recommend a customer-specific preferred payment method to the customer's user device based on the merchant trust score, and/or selectively enable or disable non-preferred payment methods for the particular merchant.

BACKGROUND

When attempting to make a purchase from a merchant, particularly a small, new, or otherwise unfamiliar merchant, a potential purchaser wants to know that they are dealing with a legitimate (and ideally reputable) business. The potential purchaser wants to make sure that their credit card, bank information, and identity are not compromised when making a purchase among other things, and such a compromise presents risk, expense, and inconvenience to both the potential purchase (or credit card holder) and the financial service provider (or credit card provider). For example, from the potential purchaser's perspective, a fraudulent charge using their credit card or other banking information can present a risk as to who is on the hook for fraudulent charge, require actions from the potential purchaser to help monitor for future fraudulent charges, and inconvenience the potential purchaser by requiring replacement of the credit card and updating all recurring charges (e.g., for utilities, donations, etc.) and saved payment profiles to use the new credit card's information. Similarly, from the financial service provider's perspective, a fraudulent charge likely exposes them to liability for the fraud along with the expense of issuing a new credit card and potentially providing credit monitoring services.

Accordingly, there is a need for improved systems to (i) alert a potential buyer when that are potentially buying from a merchant with a low trust score and identify how to make safer purchases from such a merchant and (ii) give customers of new or relatively unknown merchants more confidence to make purchases from new or start-up merchants rather than established merchants. Embodiments of the present disclosure are directed to this and other considerations.

SUMMARY

Disclosed embodiments provide systems for generating a merchant trust score and selectively sending a recommended payment method to a user device based on the merchant trust score.

The system may include one or more processors and a memory in communication with the one or more processors and storing instructions that when executed by the one or more processors, are configured to cause the system to perform steps of a method. The method may receive information identifying a merchant (e.g., ABC Company) from a user device (e.g., a smart phone associated with a customer of a financial service provider). Upon receiving the identifying information, the system may retrieve transaction data associated with the merchant and receive website data from the merchant's website. Using a machine learning model and based on the transaction data and the website data, the system may generate a merchant trust score for the merchant and determine whether the merchant trust score is less than a predetermined threshold. When the merchant trust score is less than the predetermined threshold, the system may generate or retrieve a temporary credit card number (e.g., a credit card number that expires after an expiration period, a credit card number that expires after a limited number of uses such as a one-time-use credit card number, or both) and send a first notification including the merchant trust score of the merchant and the temporary credit card number to the user device. On the other hand, when the merchant trust score is greater than or equal to the predetermined threshold, the system may further send a second notification including the merchant trust score to the user device when the merchant trust score is greater than or equal to the predetermined threshold.

Alternatively, the system may include one or more processors and a memory in communication with the one or more processors and storing instructions that when executed by the one or more processors, are configured to cause the system to perform steps of a method. The system may include receiving information identifying a merchant (e.g., ABC company) from a user device (e.g., a smart phone). After receiving information identifying the merchant, the system may generate a merchant trust score for the merchant identified by the user device and determine whether the merchant trust score is less than a predetermined threshold. When the merchant trust score is less than the predetermined threshold, the system may generate or retrieve a temporary credit card number and send a first notification including the merchant trust score of the merchant and the temporary credit card number to the user device. On the other hand, when the merchant trust score is greater than or equal to the predetermined threshold, the system may further send a second notification including the merchant trust score to the user device when the merchant trust score is greater than or equal to the predetermined threshold.

Alternatively, the system may include one or more processors and a memory in communication with the one or more processors and storing instructions that when executed by the one or more processors, are configured to cause the system to perform steps of a method. The system may generate a merchant trust score for the merchant (e.g., ABC company) and determine that the merchant trust score is less than a predetermined threshold. The system may send a notification including the merchant trust score of the merchant and the recommended payment method to a user device (e.g., a smart phone) associated with a potential customer of the merchant.

Further features of the disclosed systems, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
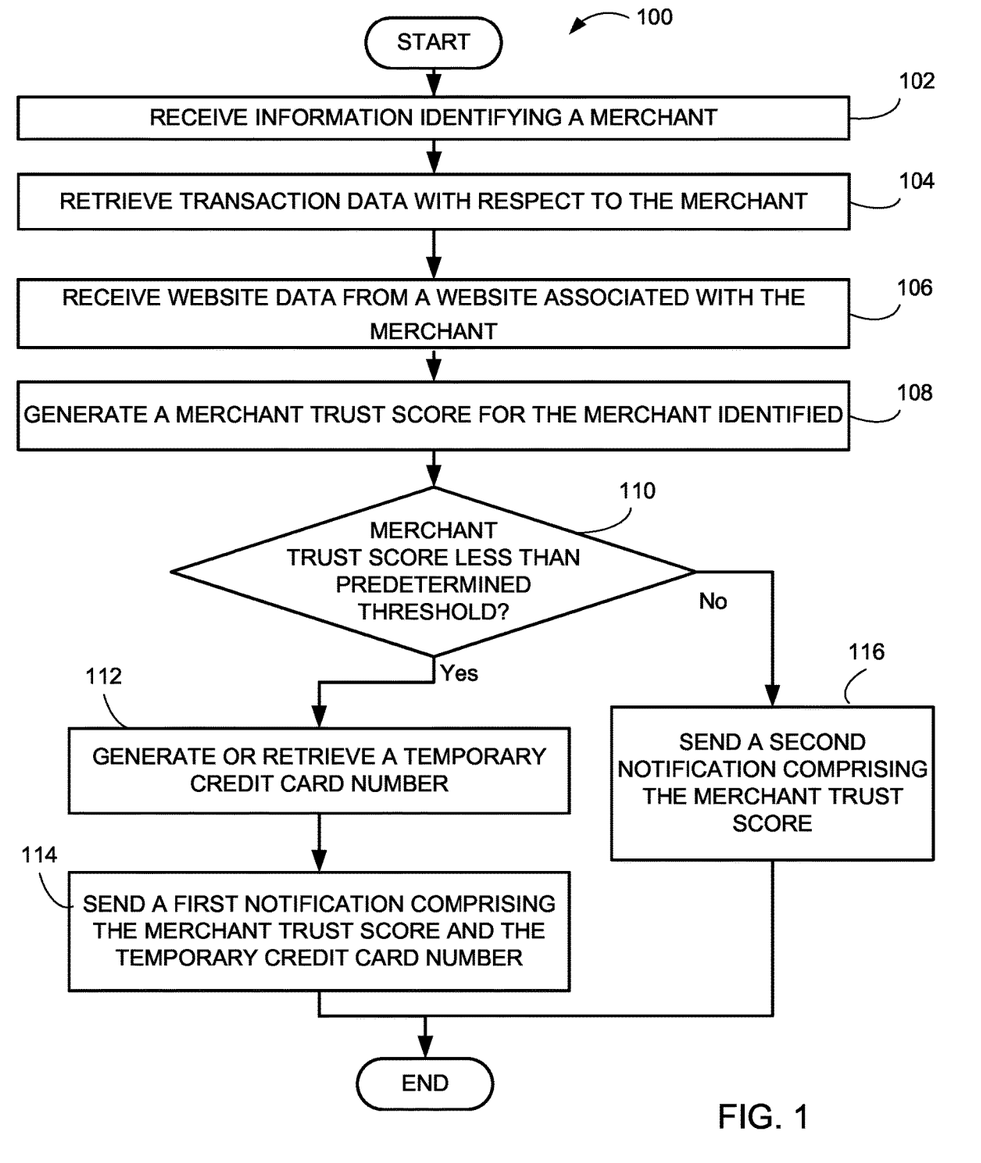
FIG. 1 is a flowchart of an exemplary method for determining whether to preemptively generate and send a temporary credit card number to a user device.

FIG. 1 shows a flowchart of a method 100 for generating a merchant trust score and selectively sending a recommended payment method (e.g., a temporary payment credit card number) to a user device based on the merchant trust score. Method 100 may be performed by a payment security system (e.g., a trust score system 420 and/or some or all of the devices and systems within a system 500 described with respect to FIGS. 4 and 5 below).

In block 102, the payment security system (e.g., trust score system 420) may receive information identifying a merchant from a user device. The information identifying the merchant may include a merchant name, a store number, a merchant category code, an address, a website, GPS coordinates, video, one or more images, a website uniform resource locator (URL), or some combination thereof. The user device may transmit the information identifying a merchant to the trust score system 420 via a network. The trust score system 420 may receive the information identifying the merchant via a text message, a form entry in a website controlled or owned by a payment security organization, an entry into a mobile application associated with the organization, an email, or a voice call.

In block 104, the payment security system (e.g., trust score system 420) may retrieve transaction data associated with the merchant. The system may retrieve the merchant transaction data from a database or a remote database. The transaction data may include merchant breach history (i.e., the number of data breaches at the merchant), merchant rate of return (i.e., the number of returns divided by the number of transactions), merchant volume (i.e., the number of transactions from the merchant), merchant card-not-present (CNP) versus card present (CP) ratio (i.e., the ratio of CNP transactions compared to CP transaction at the merchant), merchant spend volume (i.e., the amount spent by a merchant), customer dispute rates (e.g., where a merchant does not deliver quality products or services), fraud, fraud decline rate trend (e.g., whether a particular merchant is targeted by fraudster on a weekly or monthly basis), or some combination thereof.

In block 106, the payment security system (e.g., trust score system 420) may receive, from a website associated with the merchant, website data in response to receiving information identifying the merchant. The website may be controlled or owned by the merchant. Part of receiving the website data may include evaluating various features of the website. For example, the payment security system (e.g., trust score system 420) may use a web crawler or a visual web crawler/scraper to evaluate or identify information on the merchant's website.

The web crawler (not to be confused with the visual web crawler) may look for a merchant's contact information or contact page to see if it exists and/or to verify that a merchant has a physical location, phone, and email address. To search for a contact page, the web crawler can look at for a specific URL (e.g., merchant.com/contact) or could be trained to look for contact pages (e.g., the web crawler only downloads web pages that have phone number, address, and emails on them). Once a web crawler has "crawled" a website, it will report back to the trust score system 420 on what it found (e.g., no contact information, contact information, or contact information but some missing). The trust score system 420 can use what the web crawler found or did not find as an input to determine whether the merchant website seems legitimate (e.g. the presence of a physical location, phone number and email increases the likelihood that a merchant is legitimate and affect the merchant trust score generated by the payment security system in block 108).

Alternatively or additionally, the payment security system (e.g., trust score system 420) may use a visual web crawler or scrapper, which may be trained by a user. In some embodiments, a user highlights particularly relevant data (e.g., contact information and product inventory information) in a browser of a website for the visual web crawler or scraper to recognize. Once at the target merchant's website, the visual web crawler or scraper may extract data from the merchant's website main page, as well as any other pages associated with the website, and store the extracted data into a database (e.g., database 516 or database 524). The payment security system 508 may determine whether the stored extracted data corresponds to contact information and/or product inventory information on the merchant's website, both of which affect the merchant trust score generated by the payment security system in block 108.

As another example in evaluating the merchant's website, the payment security system (e.g., trust score system 420) may instruct an automated phone dialer to call a phone number listed in the contact information of the merchant's website, receive a voice response during the call, and determine whether the listed phone number is correctly associated with the merchant based on the voice response. The merchant trust score is based on whether the listed phone number is correctly associated with the merchant such that when the phone number is correctly associated with the merchant, the merchant trust score is positively influenced and when the phone number is not correctly associated with the merchant or has no voice response, the merchant trust score is negatively influenced.

As a further example in evaluating the merchant's website, the payment security system (e.g., trust score system 420) may simulate a checkout process found on the website and determine whether the checkout process requests unnecessary personal information. Unnecessary personal information would generally include bank account numbers and social security numbers. Unnecessary personal information may also include birthdate, mother's maiden name, dog's name, name of your elementary school, etc. If the payment security system (e.g., trust score system 420) determines that the checkout process requests unnecessary personal information, then at least some of the website data (e.g., the website data corresponding to the checkout process) may negatively influence the merchant trust score. If the system determines that the checkout process does not request unnecessary personal information, then at least some of the website data (e.g., the website data corresponding to the checkout process) may positively influence the merchant trust score.

As an optional step, the method implemented by the payment security system (e.g., trust score system 420) may include transmitting a request for merchant data from the merchant. The merchant data may include volume spend data (i.e., total dollar amount of all processed transactions), transaction data, or some combination thereof. This data can be validated to positively or negatively impact the merchant's trust score.

In block 108, the payment security system (e.g., via trust score system 420) may generate, using a machine learning model and based on the transaction data and the website data, a merchant trust score for the merchant. The machine learning model may involve an artificial neural network, decision trees, support vector machines, or a Bayesian network. The merchant trust score is generated by evaluating the obtained transaction data and website. Each piece of data may influence the score of merchant trust score. For example, the transactional data may include merchant breach history, merchant rate of return, merchant volume, and/or CNP to CP ratio. If a merchant has a number of data breaches that exceeds a predetermined threshold, then the system would consider that a negative influence in generating the merchant trust for that particular merchant. If, on the other hand, a merchant has a number of data breaches that does not exceed a predetermined threshold, then the system would consider that a positive influence in generating the merchant trust for that particular merchant. As another example, if a merchant has a rate of return that exceeds a predetermined threshold, then the system would consider that a negative influence in generating the merchant trust for that particular merchant. If, on the other hand, a merchant has a rate of return that does not exceed a predetermined threshold, then the system would consider that a positive influence in generating the merchant trust for that particular merchant. As another example, if a merchant has a volume of sales (i.e., merchant volume) that exceeds a predetermined threshold, then the system would consider that a positive influence in generating the merchant trust score for that particular merchant. If, on the other hand, a merchant has a volume of sales (i.e., merchant volume) that does not exceed a predetermined threshold, then the system would consider that a negative influence in generating the merchant trust for that particular merchant. As a further example, if a merchant has a CNP to CP ratio that is higher than a predetermined threshold, then the system would consider that a negative influence in generating the merchant trust score for that particular merchant. If, on the other hand, a merchant has a CNP to CP ratio that does not exceed a predetermined threshold, then the system would consider that a positive influence in generating the merchant trust score for that particular merchant. If a merchant has a customer dispute rate that is below a predetermined threshold, then the trust score system 420 would consider that a positive influence in generating the merchant trust score for that particular merchant. If a merchant has a customer dispute rate that is equal to or above a predetermined threshold, then the trust score system 420 would consider that a negative influence in generating the merchant trust score for that particular merchant. If a merchant has a spike in fraud (e.g., a fraud rate), then the trust score system 420 would consider that a negative influence in generating the merchant trust score for that particular merchant. If a merchant has consistent fraud (e.g., a fraud rate) under a predetermined threshold, then the trust score system 420 would consider that a positive influence in generating the merchant trust score for that particular merchant. If a merchant has a fraud decline rate trend under a predetermined threshold, then the trust score system 420 would consider that a positive influence in generating the merchant trust score for that particular merchant. However, if the merchant has a fraud decline rate trend at or above a predetermined threshold, then the trust score system 420 would consider that a negative influence in generating the merchant trust score for that particular merchant.

If merchant data such as volume spend data and transaction data is received from the merchant, then the merchant trust score may also be generated based on the received merchant data. For example, the trust score system 420 may receive volume spend data from the merchant and analyze it. If the volume spend data for merchant A corresponds to a consistent $100K a month or merchant A is consistently increasing their spend volume, the merchant trust score is positively impacted. However, if the trust score system 420 determines that there are spikes of spend, the trust score system 420 may do a deeper analysis to determine whether the spikes of spend correlate to a holiday, a sale, being featured in some advertisement, a data breach, or another explanation. If the spike corresponds to a holiday, a sale, an advertisement, then the merchant trust score may not be impacted by the spike. However, if the trust score system 420 determines that the merchant fell victim to a data breach, the merchant trust score may be negatively impacted.

In block 110, the payment security system (e.g., via trust score system 420) may determine whether the merchant trust score is less than a predetermined threshold. For example, the merchant trust score may range from 1 to 100 with 100 being the best possible merchant trust score. The system may set the predetermined threshold at an arbitrary initial value (e.g., 60), an industry-specific initial value based on the risk level associated with the industry of the merchant, or a customer-inputted value.

In block 112, when the merchant trust score is less than the predetermined threshold, the payment security system (e.g., via trust score system 420) may generate or retrieve a temporary credit card number (e.g., a credit card number that expires after an expiration period (e.g., 15 minutes), that expires after a limited number of uses (e.g., after one use), or both). For example, the system may be in charge of generating the temporary credit card number or more likely, the system may retrieve the temporary credit card number from a remote temporary credit card generator or retrieve the temporary credit card number from a local or remote database. The temporary credit card number is associated with the user's credit card account at the organization associated with the payment security system. The temporary credit card number is a credit card number linked to the user's credit card account that includes the temporary credit card number, a temporary expiration date, a temporary security code, or some combination thereof.

In block 114, the payment security system (e.g., via trust score system 420) may send a first notification including the merchant trust score of the merchant and the temporary credit card number to the user device. After receiving the temporary credit card number, a user may proceed to provide that number and any associated information (e.g., a temporary expiration date, a temporary security code) to a merchant via a website, an application (e.g., a mobile application). Using the temporary credit card number to make a purchase, the transaction and charge goes to the user's credit card account in the same way that it would if the user had used their actual credit card number and associated information (e.g., expiration date, security code, billing zip code). The only difference is that the temporary credit card number (i.e., the temporary credit card number) cannot be used again to make a second purchase (either by the merchant, a merchant employee, or even the user/owner of credit card account). This provides a layer of security for both the user and the credit card company. It essentially eliminates fraudulent charges subsequent to a purchase (fraudulent charges are almost impossible because the temporary credit card number can only be used a limited number of times (e.g., one time) or for a limited period of time).

In block 116, when the merchant trust score is greater than or equal to the predetermined threshold, the payment security system (e.g., via trust score system 420) may send a second notification comprising the merchant trust score to the user device. Although a temporary credit card number may be a good recommendation to a user when a merchant has a low trust score (e.g., a merchant trust score that is less than a predetermined threshold), for merchants that are trusted (e.g., have a merchant trust score that is equal to or greater than the predetermined threshold) a user may prefer to enter their actual credit card number. For example, the user may plan to make future purchase from the merchant and doesn't want to keep entering a new temporary credit card number every time. Instead, the user may want to trust the merchant so they can store their credit card information online or in an application associated with the merchant. Thus, instead of the payment security system (e.g., trust score system) defaulting to always recommending a temporary credit card number, the system is more nuanced as it is based on the merchant trust score.

Figure 2:
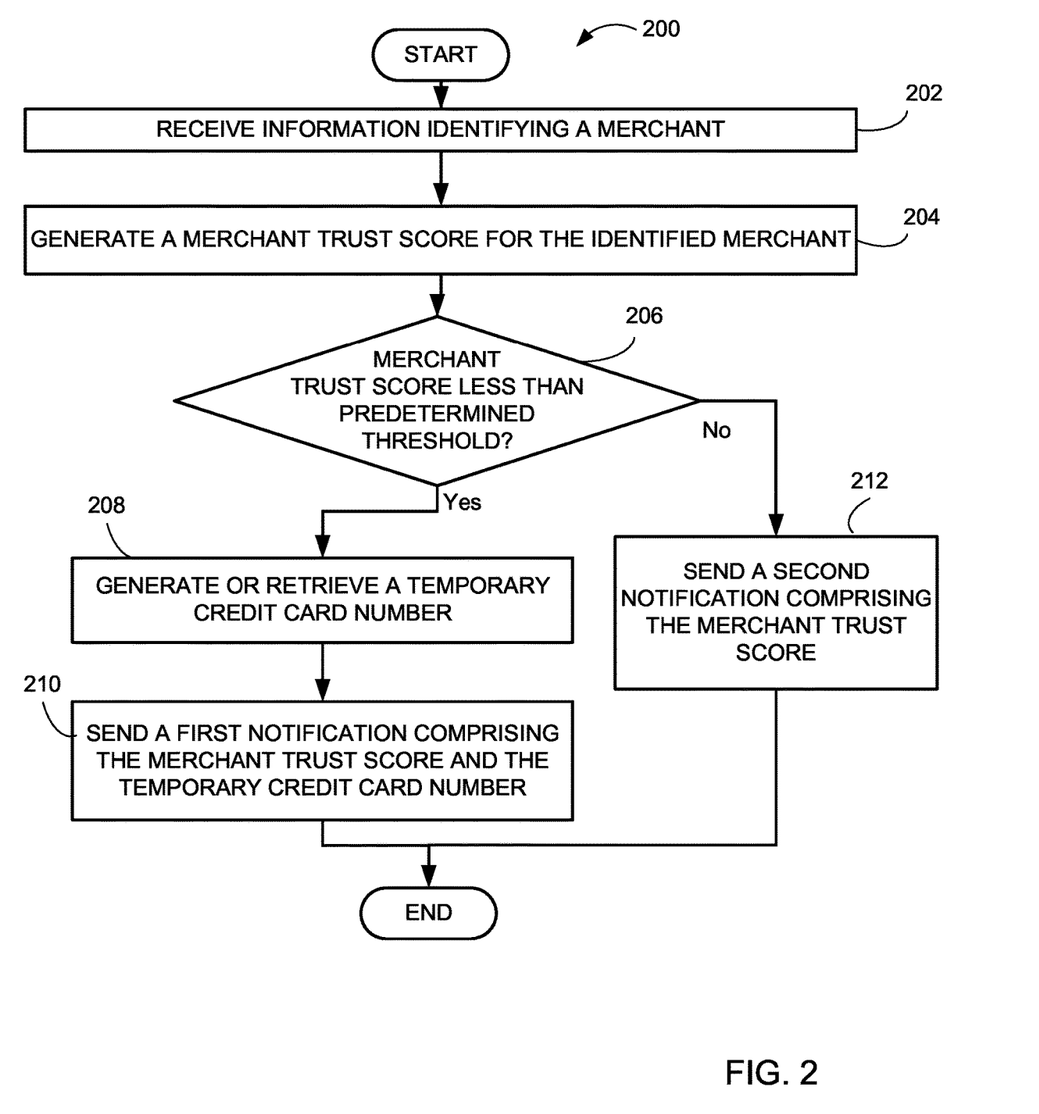
FIG. 2 is a flowchart of another exemplary method for determining whether to preemptively generate and send a temporary credit card number to a user device.

FIG. 2 shows a flowchart of a method 200 for generating a merchant trust score and selectively sending a recommended payment method to a user device based on the merchant trust score. Method 200 may be performed by a payment security system (e.g., a trust score system 420 and/or some or all of the devices and systems within a system 500 described with respect to FIGS. 4 and 5 below). Method 200 is similar to method 100 except that method 200 does not include steps or blocks similar to blocks 104 and 106. However, blocks 202, 204, 206, 208, 210, and 212 are substantially similar to blocks 102, 108, 110, 112, 114, and 116 and incorporate by reference the descriptions referring to blocks 102, 108, 110, 112, 114, and 116 above. Thus, for case of reference and conciseness, the descriptions of blocks 102, 108, 110, 112, 114, and 116 will not be repeated for blocks 202, 204, 206, 208, 210, and 212.

Figure 3:
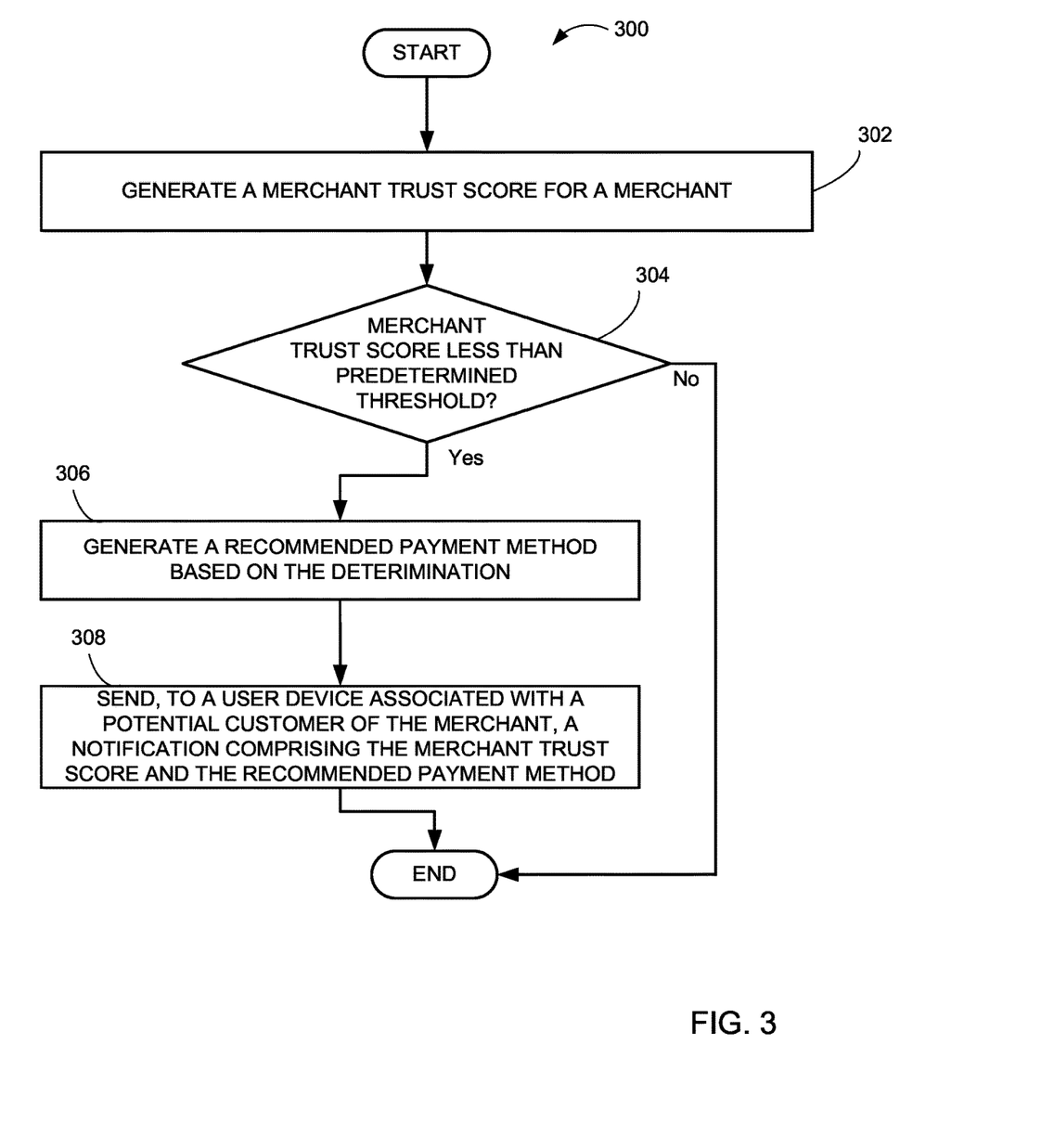
FIG. 3 is a flowchart of a further exemplary method for determining whether to generate and send a recommended payment method to a user device.

FIG. 3 shows a flowchart of a method 300 for generating a merchant trust score and selectively sending a recommended payment method to a user device based on the merchant trust score. Method 300 may be performed by a payment security system (e.g., a trust score system 420 and/or some or all of the devices and systems within a system 500 described with respect to FIGS. 4 and 5 below). Method 300 recites blocks 302 and 304, which are substantially similar to blocks is similar to blocks 108 and 110 in method 100. The description of blocks 108 and 110 are incorporated by reference for blocks 302 and 304. Thus, for case of reference and conciseness, the descriptions of blocks 108 and 110 will not be repeated for blocks 302 and 304.

In block 306, when it is determined that the merchant trust score is less than the predetermined threshold, the payment security system (e.g., via risk score system 420) may generate a recommended payment method (e.g., a credit card payment with a temporary credit card number) based on the determination.

In block 308, the payment security system (e.g., via risk score system 420) may send, to a user device associated with a potential customer of the merchant, a notification comprising the merchant trust score and the recommended payment method (e.g., a credit card payment with a temporary credit card number).

Figure 4:
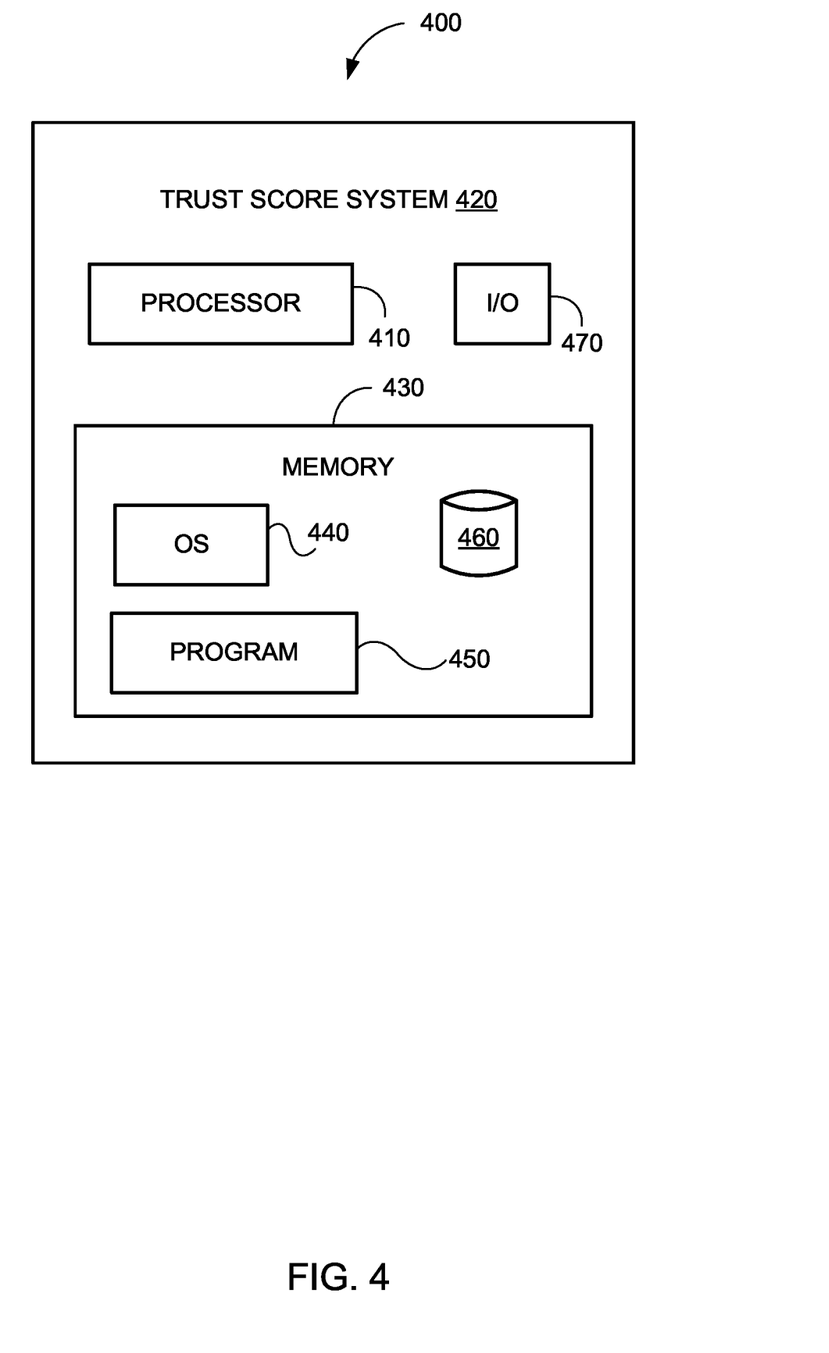
FIG. 4 is a component diagram of an exemplary trust score system.

FIG. 4 is a component diagram of an example of the trust score system 420 that may be used to generate a merchant trust score and generate and send a payment recommendation (e.g., a temporary credit card number) to a user device for use.

As shown, trust score system 420 may include a processor 410, an input/output ("I/O") device 470, a memory 430 containing an operating system ("OS") 440 and a program 450. For example, trust score system 420 may be a single device or server or may be configured as a distributed computer system including multiple servers, devices, or computers that interoperate to perform one or more of the processes and functionalities associated with the disclosed embodiments. In some embodiments, trust score system 420 may further include a peripheral interface, a transceiver, a mobile network interface in communication with the processor 410, a bus configured to facilitate communication between the various components of trust score system 420, and a power source configured to power one or more components of trust score system 420.

A peripheral interface (not shown) may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver (not shown) may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface (not shown) may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to components requiring power.

Processor 410 may include one or more of a microprocessor, microcontroller, digital signal processor, co-processor or the like or combinations thereof capable of executing stored instructions and operating upon stored data. Memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 430.

Processor 410 may be one or more known processing devices, such as a microprocessor from the Pentium™ family manufactured by Intel™ or the Turion™ family manufactured by AMD™. Processor 410 may constitute a single core or multiple core processor that executes parallel processes simultaneously. For example, processor 410 may be a single core processor that is configured with virtual processing technologies. In certain embodiments, processor 410 may use logical processors to simultaneously execute and control multiple processes. Processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Trust score system 420 may include one or more storage devices configured to store information used by processor 410 (or other components) to perform certain functions related to the disclosed embodiments. In some embodiments, trust score system 420 may include memory 430 that includes instructions to enable processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, trust score system 420 may include memory 430 that includes instructions that, when executed by processor 410, perform one or more processes consistent with the functionalities disclosed herein. Methods, systems, and articles of manufacture consistent with disclosed embodiments are not limited to separate programs or computers configured to perform dedicated tasks. For example, trust score system 420 may include memory 430 that may include one or more programs 450 to perform one or more functions of the disclosed embodiments. Moreover, processor 410 may execute one or more programs 450 located remotely from payment security system 508 (see FIG. 5). For example, payment security system 508 may access one or more remote programs 450, that, when executed, perform functions related to disclosed embodiments. In some embodiments, trust score system 420 may include a metadata and password risk scoring program 450 that is a rules-based program for assigning or generating a metadata risk score that may represent how closely metadata (e.g., user device location information, MAC ID of the user device, and an attempted login time) associated with an attempted login corresponds to metadata associated with previous attempted logins and assigning or generating a password risk score that may represent how closely an attempted password corresponds to previous attempted passwords and a correct password.

Memory 430 may include one or more memory devices that store data and instructions used to perform one or more features of the disclosed embodiments. Memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 430 may include software components that, when executed by processor 410, perform one or more processes consistent with the disclosed embodiments. In some embodiments, memory 430 may include a database 460 for storing related data to enable trust score system 420 to perform one or more of the processes and functionalities associated with the disclosed embodiments.

Trust score system 420 may also be communicatively connected to one or more memory devices (e.g., databases) locally or through a network. The remote memory devices may be configured to store information and may be accessed and/or managed by trust score system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Trust score system 120 may also include one or more I/O devices 420 that may comprise one or more interfaces for receiving signals or input from devices and providing signals or output to one or more devices that allow data to be received and/or transmitted by trust score system 420. For example, trust score system 420 may include interface components, which may provide interfaces to one or more input devices, such as one or more keyboards, mouse devices, touch screens, track pads, trackballs, scroll wheels, digital cameras, microphones, sensors, and the like, that enable trust score system 420 to receive data from one or more users.

In exemplary embodiments of the disclosed technology, trust score system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Figure 5:
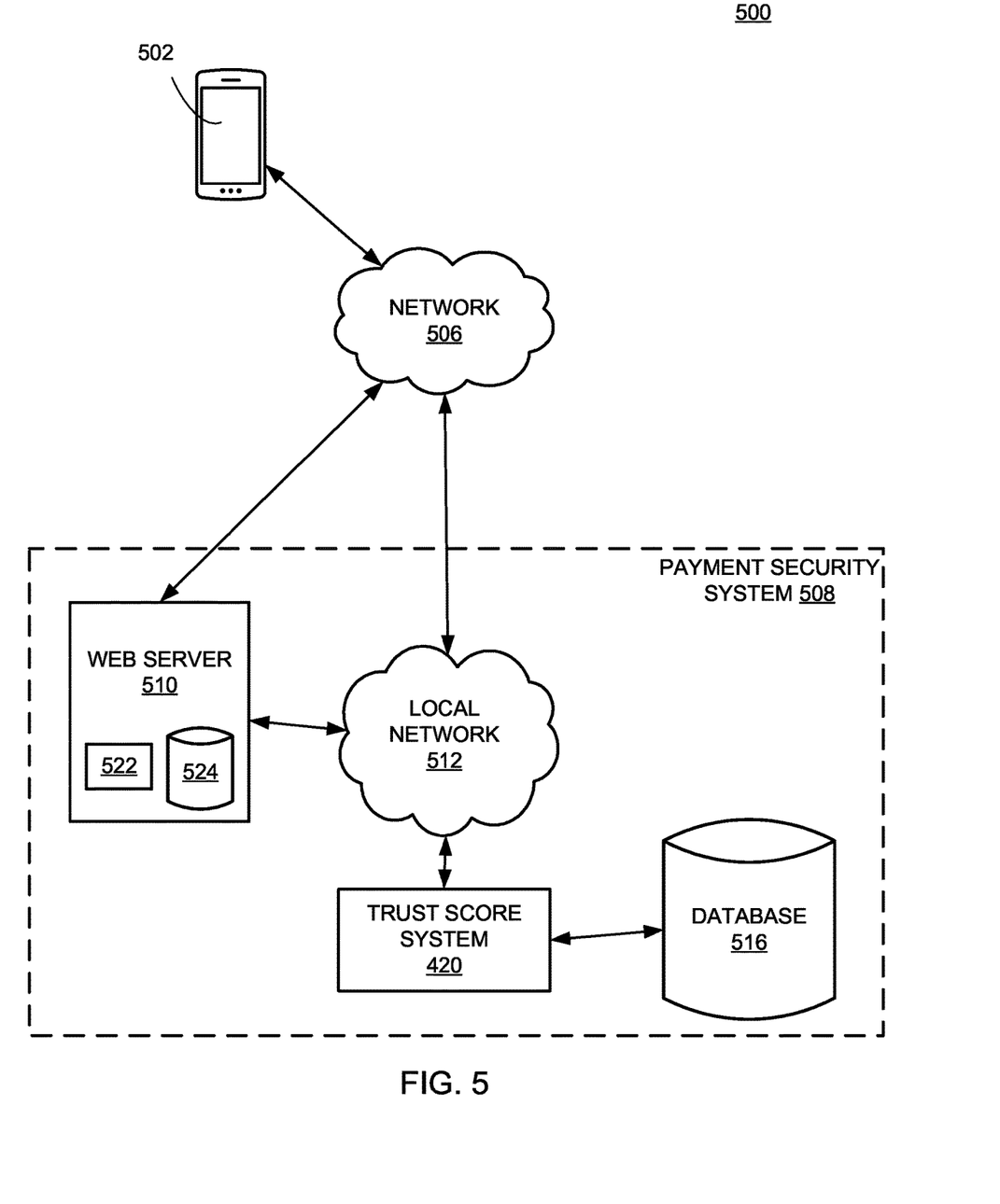
FIG. 5 is a diagram of an exemplary system for generating a trust score and recommending a payment method depending on the trust score.

FIG. 5 is a block diagram of an example system 500 that may be used to generate a merchant trust score and generate and send a payment recommendation (e.g., a temporary credit card number) to a user device for use. The components and arrangements shown in FIG. 5 are not intended to limit the disclosed embodiments as the components used to implement the disclosed processes and features may vary. As system 500 may include a user device 502 and a payment security system 508 configured to communicate over a network 506. The payment security system 108, or one or more components therein, may be configured to interact with the user device 502 (e.g., send a generated merchant trust score and/or a temporary credit card number to user device 502). As shown, the payment security system 508 may include, for example, a web server 510, a local network 512, a trust score system 420, and a database 516. Web server 510 and/or user device 502 may have a similar structure as shown and described with respect to FIG. 4 and may include many components that are similar to or even have the same capabilities as those described with respect to trust score system 420.

In some embodiments, a customer may operate a user device 502. Although user device 502 is shown to be a smart phone, user device 502 can each include one or more of a mobile device, smart phone, general purpose computer, tablet computer, laptop computer, telephone, PSTN landline, smart wearable device, other mobile computing device, or any other device capable of communicating with other devices (e.g., including those of payment security system 508) via the local network 512, network 506, or both. In some embodiments, user device 102 may include or incorporate electronic communication devices for hearing or vision impaired users. User device 102 may belong to or be provided by a user, or may be borrowed, rented, or shared. According to some embodiments, user devices 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Local network 512 may comprise any type of computer networking arrangement used to exchange data in a localized area, such as WiFi, Bluetooth™, Ethernet, and other suitable network connections that enable user device 102 to interact with one another and to connect to network 506 for interacting with components in system environment 500. In some embodiments, local network 512 may comprise an interface for communicating with or linking to network 506. In some embodiments, local network 512 may include a home network, such as a LAN or WLAN set up in a user's house. In some embodiments, local network 512 may be commonly used network of a local business, such as, for example, a Wi-Fi network at a particular coffee shop.

Network 506 may be of any suitable type, including individual connections via the internet such as cellular or WiFi networks. In some embodiments, network 506 may connect terminals, services, and mobile devices including by using direct connections such as radio-frequency identification (RFID), near-field communication (NFC), Bluetooth™, low-energy Bluetooth™ (BLE), WiFi™, ZigBee™, ambient backscatter communications (ABC) protocols, USB. WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 506 may comprise any type of computer networking arrangement used to exchange data. For example, network 506 may be the Internet, a private data network, virtual private network using a public network, and/or other suitable connection(s) that enables components in system environment 500 to send and receive information between the components of system 500. Network 506 may also include a public switched telephone network ("PSTN") and/or a wireless network.

Payment security system 508 may be associated with an entity such as a business, corporation, individual, partnership, or any other group that provides one or more of goods, services, and consultations to individuals who are or potentially are consumers of those goods, services, and consultations.

Payment security system 508 may include one or more servers, devices, and computer systems for performing one or more functions associated with products and/or services that the entity associated with the payment security system 508 provides. Such servers, devices, and computer systems may include, for example, web server 510 and trust score system 420, as well as any other computer systems necessary to accomplish tasks associated with organization system 108.

Web server 510 may include a computer system configured to generate and provide one or more websites accessible to customers, as well as any other individuals involved in payment security system 508's normal operations. Web server 510 may include a computer system configured to receive communications from user device 502 via for example, a mobile application, a chat program, an instant messaging program, a voice-to-text program, an SMS message, email, or any other type or format of written or electronic communication. Web server 510 may have one or more processors 522 and one or more web server databases 524, which may be any suitable repository of website data. Information stored in web server 510 may be accessed (e.g., retrieved, updated, and added to) via local network 512 and/or network 506 by one or more devices or systems (e.g., trust score system 510) of system 500. In some embodiments, web server 510 may host websites or applications that may be accessed by the user device 102. For example, web server 510 may host a financial service provider website that a user device may access by providing an attempted login that are authenticated by the trust score system 420. According to some embodiments, web server 510 may include software tools, similar to those described with respect to user device 502 above, that may allow web server 510 to obtain network identification data from user device 502.

Local networks 512 may comprise any type of computer networking arrangement used to exchange data in a localized area, such as WiFi, Bluetooth™, Ethernet, and other suitable network connections that enable components of payment security system 508 to interact with one another and to connect to network 506 for interacting with components in system environment 500. In some embodiments, local network 512 may comprise an interface for communicating with or linking to network 506. In other embodiments, components of payment security system 508 may communicate via network 506, without a separate local network 512.

Database 516 may be a database associated with payment security system 508 and may store a variety of information relating to users, transactions, user credentials (e.g., user names and passwords), customer networks and devices, and business operations. Database 516 may also serve as a back-up storage device and may contain data and information that is also stored on, for example, local databases associated with web server 510, trust score system 420. Database 516 may be accessed by other devices or systems (e.g., trust score system 420) and may be used to store records of every interaction, communication, and/or transaction a particular user has had with payment security system 508.

While web server 510 and trust score system 420 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 510 and trust score system 420 may include a greater or lesser number of components than those illustrated.

Although the preceding description describes various functions of user device 102, web server 510, database 516, and trust score system 420, in some embodiments, some or all of these functions may be carried out by a single computing device.

Exemplary Use Cases

The following exemplary use cases describe examples of a typical user flow pattern. They are intended solely for explanatory purposes and not in limitation. A user may want to know whether a merchant (e.g., a small merchant) is trustworthy before purchasing a product or service from that company. The user sends information identifying the merchant (e.g., name of the merchant, store number, merchant category code, merchant address, merchant website, or some combination thereof) to the payment security system 508 (e.g., trust score system 420). For example, the user, operating a user device (e.g., a mobile device or desktop computer) may send the identifying information to payment security system 508 (e.g., trust score system 420) via network 506 and optional via local network 512. This may take the form of an email from the user device 502, a text message, an entry of a form on a website or an application, et cetera. The payment security system 508 (e.g., trust score system 420) may receive the information identifying the merchant from the user device 502. The payment security system 508 (e.g., trust score system 420) may retrieve transaction data (e.g., merchant breach history, merchant rate of return, merchant volume, CNP to CP ratio) associated with the merchant assuming that the payment security system 508 is own, operated, or controlled by a credit card company that has made purchases from the merchant. If that is the case, then credit card company already has past transaction data and the trust score system 420 simply needs to retrieve it from a remote database. The payment security system 508 (e.g., trust score system 420) may website data from a website associated with the merchant. The payment security system 508 may evaluate the various features of the website. For example, the payment security system 508 (e.g., trust score system 420 or web server 510) may use a web crawler (i.e., an internet bot that browses the World Wide Web) to evaluate the merchant's website. Once at the merchant's website, the web crawler (or trust score system 420 or web server 510) may determine whether the merchant's website comprises contact information and/or product inventory information on the website, both of which affect the merchant trust score generated by the trust score system 420 in block 108.

As another example in evaluating the merchant's website, the payment security system 508 (e.g., trust score system 420) may instruct an automated phone dialer to call a phone number listed in the contact information of the merchant's website, receive a voice response during the call, and determine whether the listed phone number is correctly associated with the merchant based on the voice response. The merchant trust score is based on whether the listed phone number is correctly associated with the merchant such that when the phone number is correctly associated with the merchant, the merchant trust score is positively influenced and when the phone number is not correctly associated with the merchant or has no voice response, the merchant trust score is negatively influenced.

As a further example in evaluating the merchant's website, the payment security system 508 (e.g., trust score system 420 or web server 510) may simulate a checkout process found on the website and determine whether the checkout process requests unnecessary personal information. Unnecessary personal information would generally include bank account numbers and social security numbers. Unnecessary personal information may also include birthdate, mother's maiden name, dog's name, name of your elementary school, etc. If the payment security system 508 (e.g., trust score system 420 or web server 510) determines that the checkout process requests unnecessary personal information, then at least some of the website data (e.g., the website data corresponding to the checkout process) may negatively influence the merchant trust score. If the system determines that the checkout process does not request unnecessary personal information, then at least some of the website data (e.g., the website data corresponding to the checkout process) may positively influence the merchant trust score.

The payment security system 508 (e.g., trust score system 420) may generate a merchant trust score for the merchant, which may be generated by a machine learning model. The merchant trust score for any particular merchant may be a number between 1 and 100. The generated score may be 85 out of 100 signifying that the merchant has a relatively high trust score and can be trusted. Alternatively, the generated trust score could be 40 signifying that the merchant has a relatively low trust score. An administrator of the payment security system 508 or payment security system 508 (e.g., trust score system 420) may set a predetermined threshold (e.g., 60 out of 100) and the payment security system 508 (e.g., trust score system 420) may determine whether the generated merchant trust score is less than the predetermined threshold. When the trust score system 420 determines that the merchant trust score is less than the predetermined threshold, the payment security system 508 (e.g., trust score system 420) generates or retrieves (e.g. from a remote location) a one-time-use credit card number and the payment security system 508 (e.g., trust score system 420) sends a first notification comprising the merchant trust score of the merchant to the user device and the one-time-use credit card number. When the payment security system 508 (e.g., trust score system 420) determines that the merchant trust score is greater than or equal to the predetermined threshold, the payment security system 508 (e.g., trust score system 420) sends a second notification comprising the merchant trust score to the user device.

In other examples, the user does not have to initiate the generation of a merchant trust score by the payment security system 508 (e.g., trust score system 420). In some use cases, the payment security system 508 (e.g., trust score system 420) would already be integrated in a social commerce or commerce platform, in which case the payment security system 508 (e.g., trust score system 420) would automatically show the merchant trust score whenever a user visits the merchant's store. In other words, the payment security system 508 (e.g., trust score system 420) may have already generated the merchant trust score and/or may periodically generate a merchant trust score for a particular merchant. The payment security system 508 (e.g., trust score system 420) may generate the merchant trust score based on historical payment security system 508 (e.g., trust score system 420) receive or retrieve (e.g., same institution) from a financial service provider (e.g., a bank or credit card company). If the payment security system 508 (e.g., trust score system 420) may determine that the merchant trust score exceed a predetermine threshold (e.g., the merchant is trustworthy), the payment security system 508 (e.g., trust score system 420) may transmit the score or badge to a merchant's web servers, social media platform servers, and/or ecommerce servers to display in the checkout process or at the purchase discovery stage (e.g., on or with an advertisement). For example, when a consumer scrolls in Instagram™, the user can see if there is a badge or score associated with a product advertisement. The user may have to be authenticated by payment security system 508 (e.g., trust score system 420) before the user sees the score and the receives the payment method recommendation.

To perform these various exemplary uses cases, in some examples, the system may include one or more processors and a memory in communication with the one or more processors and storing instructions that when executed by the one or more processors, are configured to cause the system to perform steps of a method. The method may include receiving information identifying a merchant from a user device, retrieving transaction data associated with the merchant, receiving, from a website associated with the merchant, website data in response to receiving information identifying the merchant, generating, using a machine learning model and based on the transaction data and the website data, a merchant trust score for the merchant, and determining whether the merchant trust score is less than a predetermined threshold. The method may also include generating or retrieving a temporary credit card number (e.g., a credit card number that may be used a limited number of times (e.g., one time), for a limited period of time, or both) and sending a first notification comprising the merchant trust score of the merchant and the temporary credit card number to the user device when the merchant trust score is less than the predetermined threshold. The method may further include sending a second notification comprising the merchant trust score to the user device when the merchant trust score is greater than or equal to the predetermined threshold.

In the method, receiving the website data may include instructing a web crawler to determine whether the website comprises contact information and instructing the web crawler to determine whether the website comprises product inventory information. The merchant trust score is based on a presence or an absence of contact information and productive inventory information.

In the method, receiving the website data may also include instructing an automated phone dialer to call a phone number listed in the contact information, receiving a voice response during the call, and determining whether the listed phone number is correctly associated with the merchant based on the voice response. The merchant trust score is based on whether the listed phone number is correctly associated with the merchant such that when the phone number is correctly associated with the merchant, the merchant trust score is positively influenced and when the phone number is not correctly associated with the merchant or has no voice response, the merchant trust score is negatively influenced.

In the method, receiving the website data may further includes simulating a checkout process found on the website and determining whether the checkout process requests unnecessary personal information. When the system determines that the checkout process requests unnecessary personal information, the merchant trust score is negatively influenced. When the system determines that the checkout process does not request unnecessary personal information, the merchant trust score is positively influenced.

The transaction data may include merchant breach history, merchant rate of return, merchant volume, merchant card-not-present (CNP) versus card present (CP) ratio, or some combination thereof.

In the method, generating the merchant trust score further includes receiving, from the merchant, merchant data comprising volume spend data, transaction data, or some combination thereof, and the merchant trust score is based on the merchant data.

The information identifying the merchant may include a merchant name, a store number, a merchant category code, an address, a website, GPS coordinates, video, one or more images, a website uniform resource locator (URL), or some combination thereof.

Alternatively, the system may include one or more processors and a memory in communication with the one or more processors and storing instructions that when executed by the one or more processors, are configured to cause the system to perform steps of a method. The method may include receiving information identifying a merchant from a user device, generating a merchant trust score for the merchant identified by the user device, and determining whether the merchant trust score is less than a predetermined threshold. The method may also include generating or retrieving a temporary credit card number and sending a first notification comprising the merchant trust score of the merchant and the temporary credit card number to the user device when the merchant trust score is less than the predetermined threshold. The method may further include sending a second notification comprising the merchant trust score to the user device when the merchant trust score is greater than or equal to the predetermined threshold.

In the method, generating the merchant trust score may include retrieving, from a database, transaction data corresponding to the merchant; and receiving, from a website of the merchant, website data. The merchant trust score may be generated based on the transaction data and the website data. The information identifying the merchant may include a merchant name, a store number, a merchant category code, an address, a website, GPS coordinates, video, one or more images, a website uniform resource locator (URL), or some combination thereof. The transaction data may include merchant breach history, merchant rate of return, merchant volume, merchant card-not-present (CNP) versus card present (CP) ratio, or some combination thereof. The method may further include transmitting a request for merchant data from the merchant.

In the method, generating the merchant trust score may further include receiving, from the merchant, the merchant data comprising volume spend data, transaction data, or some combination thereof, and the merchant trust score is based on the merchant data.

In the method, receiving the website data may include instructing a web crawler to determine whether the website comprises contact information and instructing the web crawler to determine whether the website comprises product inventory information. The merchant trust score is based on a presence or an absence of contact information and product inventory information.

In the method, receiving the website data may further include instructing an automated phone dialer to call a phone number listed in the contact information, receiving a voice response during the call, and determining whether the listed phone number is correctly associated with the merchant based on the voice response. The merchant trust score is based on whether the listed phone number is correctly associated with the merchant such that when the phone number is correctly associated with the merchant, the merchant trust score is positively influenced and when the phone number is not correctly associated with the merchant or has no voice response, the merchant trust score is negatively influenced.

In the method, receiving the website data may further comprise simulating a checkout process found on the website and determining whether the checkout process requests unnecessary personal information. When the system determines that the checkout process requests unnecessary personal information, the merchant trust score is negatively influenced. When the system determines that the checkout process does not request unnecessary personal information, the merchant trust score is positively influence.

Alternatively, the system may include one or more processors and a memory in communication with the one or more processors and storing instructions that when executed by the one or more processors, are configured to cause the system to perform steps of a method. The method may include generating a merchant trust score for the merchant and determining that the merchant trust score is less than a predetermined threshold. The method may also include sending, to a user device associated with a potential customer of the merchant, a notification comprising the merchant trust score of the merchant and the recommended payment method.

The recommended payment method may involve using a temporary credit card number. The merchant trust score may be based on transaction data retrieved from a database and may be generated by a machine learning model.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

As used in this application, the terms "component," "module," "system," "server," "processor." "memory." and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IOT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments." "example embodiment," "various embodiments," "one implementation." "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a." "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for securing transactions based on merchant trust scores, comprising:
   one or more processors; and
   memory in communication with the one or more processors and storing instructions that, when executed by the one or more processors, are configured to cause the system to:
   generate, using a machine learning model, a merchant trust score for a merchant, wherein the machine learning model comprises one or more of an artificial neural network, decision trees, support vector machines, a Bayesian network, or combinations thereof;
   determine whether the merchant trust score is less than a predetermined threshold; and
   responsive to determining that the merchant trust score is less than the predetermined threshold, generate or retrieve a temporary account number and send a first notification comprising the temporary account number to a user device.

2. The system of claim 1, wherein generating the merchant trust score comprises receiving, from the merchant, merchant data comprising volume spend data, transaction data, or both, and wherein the merchant trust score is based on the merchant data.

3. The system of claim 1, wherein the instructions are further configured to cause the system to retrieve, from a database, transaction data corresponding to the merchant, and wherein generating the merchant trust score is based on the transaction data.

4. The system of claim 3, wherein the transaction data comprises one or more of merchant breach history, merchant rate of return, merchant volume, merchant card-not-present (CNP) versus card present (CP) ratio, or combinations thereof.

5. The system of claim 1, wherein the temporary account number comprises a temporary credit card number.

6. The system of claim 1, wherein generating the merchant trust score is conducted on a periodic basis, and wherein the instructions are further configured to cause the system to:
determine that a user has navigated to a website associated with the merchant; and
responsive to determining that the user has navigated to the website associated with the merchant, automatically display the merchant trust score via the website.

7. A system for securing transactions based on merchant trust scores, comprising:
one or more processors; and
memory in communication with the one or more processors and storing instructions that, when executed by the one or more processors, are configured to cause the system to:
retrieve, via a web crawler, website data from a website associated with a merchant;
identify one or more features associated with the merchant based on the website data;
generate, using a machine learning model and based on the one or more features, a merchant trust score for the merchant;
determine whether the merchant trust score is less than a predetermined threshold; and
responsive to determining that the merchant trust score is less than the predetermined threshold, generate or retrieve a temporary account number and send a first notification comprising the temporary account number to a user device.

8. The system of claim 7, wherein the one or more features comprise one or more of a URL, a contact page, a physical location, a phone number, an email address, or combinations thereof.

9. The system of claim 7, wherein the web crawler comprises a visual web crawler trained to extract and store the one or more features.

10. The system of claim 9, wherein the visual web crawler is trained to extract and store the one or more features based on relevancy of each feature.

11. The system of claim 7, wherein retrieving the website data further comprises:
instructing an automated phone dialer to call a phone number listed on the website;
receiving a voice response during the call; and
determining whether the phone number is correctly associated with the merchant based on the voice response.

12. The system of claim 11, wherein the merchant trust score is further based on determining whether the phone number is correctly associated with the merchant such that when the phone number is correctly associated with the merchant, the merchant trust score is positively influenced, and when the phone number is not correctly associated with the merchant or has no voice response, the merchant trust score is negatively influenced.

13. The system of claim 7, wherein the instructions are further configured to cause the system to retrieve, from a database, transaction data corresponding to the merchant, and wherein generating the merchant trust score is further based on the transaction data.

14. The system of claim 13, wherein the transaction data comprises one or more of merchant breach history, merchant rate of return, merchant volume, merchant card-not-present (CNP) versus card present (CP) ration, or combinations thereof.

15. The system of claim 7, wherein the machine learning model comprises one or more of an artificial neural network, decision trees, support vector machines, a Bayesian network, or combinations thereof.

16. A system for securing transactions based on merchant trust scores, comprising:
one or more processors; and
memory in communication with the one or more processors and storing instructions that, when executed by the one or more processors, are configured to cause the system to:
conduct a simulated checkout process via a website associated with a merchant;
determine one or more types of user information requested by the merchant during the simulated checkout process;
generate, using a machine learning model and based on the one or more types of user information, a merchant trust score for the merchant;
determine whether the merchant trust score is less than a predetermined threshold; and
responsive to determining that the merchant trust score is less than the predetermined threshold, generate or retrieve a temporary account number and send a first notification comprising the temporary account number to a user device.

17. The system of claim 16, wherein the one or more types of user information comprise one or more of an account number, a social security number, a birthdate, a family member's maiden name, a pet's name, a school name, or combinations thereof.

18. The system of claim 16, wherein the instructions are further configured to cause the system to retrieve, from a database, transaction data corresponding to the merchant, and wherein generating the merchant trust score is further based on the transaction data.

19. The system of claim 18, wherein the transaction data comprises one or more of merchant breach history, merchant rate of return, merchant volume, merchant card-not-present (CNP) versus card present (CP) ration, or combinations thereof.

20. The system of claim 16, wherein the machine learning model comprises one or more of an artificial neural network, decision trees, support vector machines, a Bayesian network, or combinations thereof.

* * * * *